Aug. 16, 1938.   F. J. GERBERMANN   2,126,766
FLOWER HOLDER
Filed March 18, 1937

INVENTOR:
Frank Joseph Gerbermann

Patented Aug. 16, 1938

2,126,766

UNITED STATES PATENT OFFICE 2,126,766

FLOWER HOLDER

Frank Joseph Gerbermann, St. Louis, Mo.

Application March 18, 1937, Serial No. 131,646

3 Claims. (Cl. 47—41)

This invention relates to flower-holders, and has for its principal purpose to provide a device for holding a group of flowers in a predetermined or chosen arrangement, either within or without a container, or while being placed in or taken out of a container.

Another purpose of the present invention is to provide a holder of the character described which will securely grip the stems of the flowers to prevent their sliding out of position.

Another object is to provide a flower-holder which is adapted for ready attachment or detachment from vases or containers of divers sizes and shapes.

Another object is to provide a flower-holder which is light in weight but which nevertheless will maintain its approximate position in a container.

A further object is the provision of a portable holder which will retain a suitable amount of water when it is removed from the container.

Other objects, advantages and desirable features of the invention will appear in the course of the following description of divers illustrative embodiments of the spirit of the invention.

Figure 2:
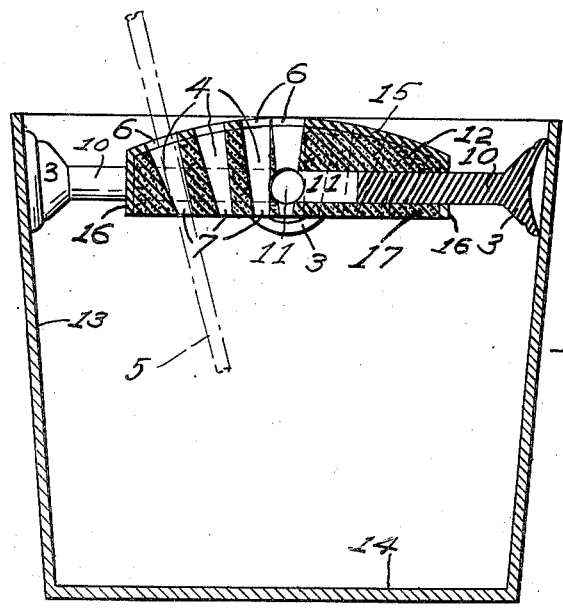
Figure 1:
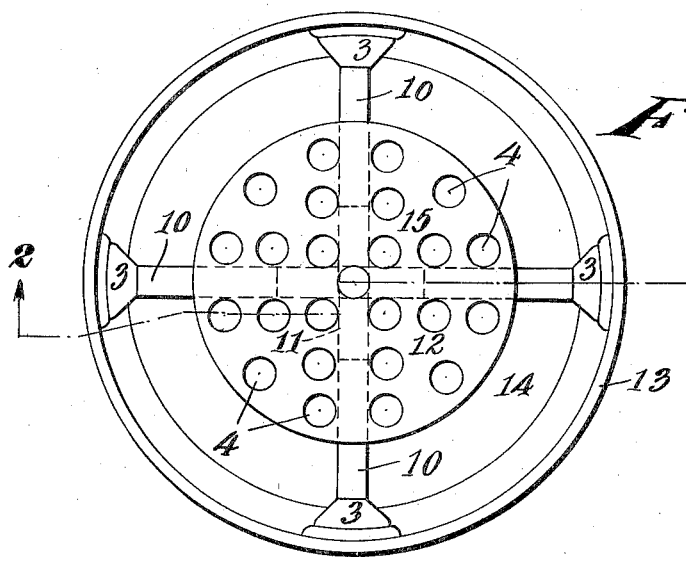

In the accompanying drawing, in which like letters of reference denote like parts wherever they occur, Figure 1 is a plan view of a holder made in accordance with this invention and having adjustable lateral attachment means for securing it to the inner side of the wall of a vase that contains it;

Figure 2 is a vertical sectional view taken on the line 2—2 in Figure 1.

Referring now to the invention shown in Figures 1 and 2, the holder comprises a body 12. The body 12 is provided with a plurality of stem-retentive conformations, exemplified by openings 4, that extend downwardly through the head 1. The openings 4 are larger at the top than at the bottom, so as to afford an ample mouth to facilitate the entrance of the flower-stems 5 into the upper ends 6 of the openings 4, while at the same time the smaller lower ends 7 of said openings 4 tend to definitely locate the stems 5. To improve their locating function, these lower ends 7 are formed in material that yields to conform to the shape of the stems 5, the material also preferably being elastic to grip closely the stems 5 to prevent their sliding up or down in the openings after they have been placed therein in desired or appropriate positions. The holder is placed in a suitable vase or container 14, partly filled with water.

Figures 1 and 2 exhibit a form of the invention having laterally-acting suction cups 3, provided with stems 10, that fit snugly in sockets 11, formed in the body 12 of the holder. The rods 10 are also preferably yieldable or flexible and elastic to a suitable degree so that the position of the vacuum-cups may be adjusted to present them squarely to the wall 13 of a container 14. The cups 3 and their stems 10 may be formed of a single piece of rubber. The cup-stems may also be adjusted back and forth in the sockets 11 to fit divers diameters of containers. The body 12 comprises a top layer 15 and a wall 16 of solid rubber on an inner portion 17 of softer or more yieldable rubber, preferably sponge rubber. The solid or less yieldable rubber layer 15 and wall 16 preserve the form of the body, while the more yieldable rubber portion 17 yields more easily to fit the flower stems at the lower ends 7 of the openings 4.

It will be appreciated that by reason of the gripping function of the openings 4, an assemblage of flowers may be inserted into or removed from a vase or other container without disturbing the set arrangement or grouping of the flowers. As far as I am aware, prior to my invention, whenever the flowers had to be removed from a vase to replenish it with fresh water, the stems of the flowers lost their places in the openings in the holders that received them, or fell out entirely, so that they had to be replaced. It will be observed that the flower-stems may be angularly shifted to a slight extent in the openings 4, by virtue of the stems being pivotally held only at the lower ends, the slight angular movement permitted by the latitude afforded by the larger upper ends of the openings 4. In using thin flower-stems, several may be inserted in one opening, to ensure their being securely held in place. It is also worthy of mention that the holder is a simple structure, economically manufactured, light in weight, and easily attached and detached. Furthermore, the sponge rubber assists in keeping moisture in contact with the stems, even though the container should, through negligence, become devoid of water.

I claim:

1. A flower-holder comprising a rubber body including an upper layer of solid rubber on an underlying portion of sponge rubber, there being openings extending through solid and the spongy portions of the body in sequence.

2. A flower-holder comprising a rubber body including an upper layer of solid rubber on an underlying portion of sponge rubber, there being openings extending through the solid and the spongy portions of the body in sequence, the said openings enlarging toward the upper side.

3. A flower-holder comprising a body having stem-retentive conformations and laterally extending sockets, and container-adhering means adjustable in said sockets.

FRANK JOSEPH GERBERMANN.